US006242404B1

(12) United States Patent
Dahanayake et al.

(10) Patent No.: US 6,242,404 B1
(45) Date of Patent: *Jun. 5, 2001

(54) ENHANCED SOIL RELEASE POLYMER COMPOSITIONS

(75) Inventors: Manilal S. Dahanayake, Princeton Junction; Gladys S. Gabriel, Cranbury; Ronald Brady Bell, Plainsboro, all of NJ (US); Paul Joel Derian, Fontenayaux-Roses (FR); Robert Gabriel, Cranbury, NJ (US)

(73) Assignee: Rhodia Inc., Cranbury, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/918,934

(22) Filed: Aug. 25, 1997

Related U.S. Application Data

(63) Continuation-in-part of application No. 08/726,437, filed on Oct. 4, 1996, now Pat. No. 5,922,663.

(51) Int. Cl.$^7$ ................... C11D 1/76; C11D 3/37
(52) U.S. Cl. ................ 510/299; 252/8.62; 510/277; 510/517; 510/528
(58) Field of Search ................. 252/312, 351, 252/357, 8.62; 510/299, 517, 528, 277; 516/67, 71, 72, 74, 76

(56) References Cited

U.S. PATENT DOCUMENTS

| 3,416,952 | 12/1968 | McIntyre ................. 117/118 |
| 3,544,501 | * 12/1970 | Fearnley et al. ............ 252/8.62 X |
| 3,893,929 | 7/1975 | Basadur ................. 252/8.6 |
| 3,959,230 | 5/1976 | Hays ................... 260/75 R |
| 3,962,152 | 6/1976 | Nicol .................... 252/551 |
| 4,057,503 | * 11/1977 | Graver et al. ............. 510/517 |
| 4,116,885 | 9/1978 | Derstadt et al. ........... 252/532 |
| 4,127,489 | 11/1978 | Pracht et al. ............. 252/8.8 |
| 4,132,600 | 1/1979 | Nicol .................... 252/547 |
| 4,201,824 | 5/1980 | Violland et al. ........... 428/262 |
| 4,349,688 | 9/1982 | Sandler ................. 560/91 |
| 4,702,857 | 10/1987 | Gosselink ............... 252/174.21 |
| 4,711,730 | 12/1987 | Gosselink ............... 252/8.75 |
| 4,713,194 | 12/1987 | Gosselink ............... 252/174.23 |
| 4,749,596 | 6/1988 | Evans et al. ............. 427/242 |
| 4,787,989 | 11/1988 | Fanelli et al. ............ 252/8.6 |
| 4,795,584 | * 1/1989 | Ross et al. .............. 510/277 |
| 4,804,483 | 2/1989 | O'Lenick ............... 252/8.8 |
| 4,846,995 | 7/1989 | Kud .................... 252/174.21 |
| 4,861,502 | 8/1989 | Caswell ................ 252/8.75 |
| 4,861,512 | 8/1989 | Gosselink ............... 252/174.23 |
| 4,873,003 | 10/1989 | O'Lenick ............... 252/8.75 |
| 4,937,227 | 6/1990 | O'Lenick ............... 524/318 |
| 4,956,447 | 9/1990 | Gosselink et al. ......... 528/272 |
| 4,999,128 | 3/1991 | Sonnenstein ............. 252/174.14 |
| 5,134,223 | 7/1992 | Langer et al. ............ 528/272 |
| 5,171,475 | * 12/1992 | Freiesleben ............. 252/312 |
| 5,236,615 | 8/1993 | Trinh et al. ............. 252/174.11 |
| 5,332,528 | 7/1994 | Pan et al. ............... 252/548 |
| 5,405,542 | 4/1995 | Trinh et al. ............. 252/8.8 |
| 5,565,145 | * 10/1996 | Watson et al. ............ 510/299 X |

FOREIGN PATENT DOCUMENTS 0 185 427   6/1986  (EP) ............... C08G/63/66

* cited by examiner

Primary Examiner—Richard D. Lovering
(74) Attorney, Agent, or Firm—Stevens, Davis, Miller & Mosher, LLP

(57) ABSTRACT

An improved soil release polymer composition comprising a soil release polymer and a long chain nonionic alkoxylate surfactant and/or amphoteric that is able to generate very low critical micelle concentration values in water. Preferably, the soil release composition is incorporated in a detergent system such as a commercial laundry detergent which comprises a second anionic, nonionic or cationic surfactant and mixtures thereof. By lowering the cmc values of the detergent wash water to very low levels, the surfactant greatly enhances the performance of the soil release polymer.

20 Claims, No Drawings

ENHANCED SOIL RELEASE POLYMER COMPOSITIONS

RELATED APPLICATIONS

This application is a continuation-in-part of co-pending application U.S. Ser. No. 08/726,437 filed on Oct. 4, 1996 and now U.S. Pat. No. 5,922,663.

BACKGROUND OF THE INVENTION

1. Field of the Invention

The present invention relates to surfactant systems and their incorporation into cleaning compositions useful in household detergents and other related uses. More particularly, the invention relates to the enhancement of soil release compositions that not only clean fabrics and articles of clothing but prevent the re-deposition of soils and stains thereon.

2. Background Discussion

Soil release agents are key ingredients in cleaning compositions, i.e., textiles, laundry and hard surfaces such as carpet-cleaning and textile treating.

These soil release agents are commonly applied to the fabric during the manufacture of clothing or textile fiber. The primary purpose of the soil release agents is to make it easier to clean the textile fibers by home cleaning methods using conventional household machines or cleaners.

For example, in most laundering processes such as conventional home washing machines or hand washing with detergent bars, it is usually very difficult to remove soil and/or oily stains from textile material. Moreover, even assuming that the undesirable materials are removed from the textile and/or a fairly clean textile material is being washed, oftentimes soil remaining in the wash water is redeposited onto the textile material prior to the end of the wash cycle. Hence, when the textile material is removed from the washing machine and subsequently dried, it has not been properly cleaned. Thus, textile materials after use rarely assume a truly clean appearance, but instead tend to gray and/or yellow due to the soil and/or oily materials being deposited or redeposited and remaining thereon.

Also, synthetic fibers and fabrics having synthetic fibers incorporated therein or those made entirely of synthetic fibers are hydrophobic and oleophilic. Therefore, the oleophilic characteristics of the fiber permit oil and grease to be readily embedded in the fiber, and the hydrophobic properties of the fiber prevent water from entering the fiber to remove the contaminants and dirt therefrom.

One solution to the soil removal and soil redeposition problem is to deposit a finish onto the fiber to impart a hydrophilic character to the fiber. Attempts have been made to reduce the oleophilic characteristics of these synthetic fibers by coating the fibers with a coating that is oleophobic, i.e., one that will hinder the attachment of soil and oil materials to the fibers. Many polymer systems have been proposed which are capable of forming a film around the textile fibers, particularly acid emulsion polymers prepared from organic acids having reactive points of unsaturation. These treating polymers are known as soil-release agents.

Typical soil release agents that have been developed for synthetic fibers and fabrics are the copolymers of ethylene glycol and terephthalic acid for the treatment of Dacron, Fortrel, Kodel and Blue C Polyester, trademarks of various synthetic fibers and fabrics.

Among the leading soil release agents developed for laundering purposes are the polyesters exemplified in U.S. Pat. No. 5,134,223 to Langer, et al.; U.S. Pat. No. 4,999,128 to Sonnenstein; U.S. Pat. Nos. 4,937,277; 4,804,483 and 4,873,003 to O'Lenick, et al.; U.S. Pat. No. 4,861,502 to Caswell; U.S. Pat. No. 4,861,512 to Gosselink; U.S. Pat. No. 4,787,989 to Fanelli, et al.; U.S. Pat. 3,962,152, 3,416,952, and 4,132,680 to Nicol; U.S. Pat. Nos. 4,201,824, and 4,349,688 to Sandler and U.S. Pat. No. 4,116,885 to Derstadt, et al. Generally these agents are polyester polymers containing terephthalate and/or urethane groups to improve water compatibility.

The term "soil-release" in accordance with the present invention refers to the ability of the fabric to be washed or otherwise treated to remove soil and/or oily materials that have come into contact with the fabric. The present invention does not wholly prevent the attachment of soils or oily materials to the fabric, but hinders such attachment and improves the cleanability of the fabric.

Concentrated solutions of soil-release polymers have been padded onto fabrics by textile manufacturers to impart a permanent soil-release finish to the fabric. As the amount of soil-release polymer on the fabric is increased, the ability of the fabric to release soil is increased. However, fabrics with this permanent soil-release finish possess many disadvantages. As the amount of soil-release polymer on the fabric is increased, the fabric has a tendency to become stiff and lose the desirable feel of the fabric. Thus, the upper limit on the amount of soil-release polymer to be used is determined by economics and the resulting adverse effect it has on the fabric. Fabrics with a heavy application of soil-release polymer do not have the same desirable appearance and feel as the same fabrics without the soil-release coating. Thus, practically speaking, there is a set concentration range of the soil-release agent that can be applied that is also dictated by commercial requirements.

Some soil-release polymers are effective fabric treating agents even at very low levels on the fabric at which the appearance and feel of the fabric are not adversely affected. Thus, this property offers an ideal method of treating a synthetic fiber-containing fabric which would be to reapply a very small amount of soil-release polymer to the fabric each time the fabric is washed.

Moreover, the soil release agent is preferably reapplied when the fabric is washed because the original soil release agent, applied to the fabric during manufacture, washes out after repeated washing by the consumer.

The problem is to get the soil release agent in the detergent solution to adequately deposit and remain on the clothing being washed. A number of theories have been proposed to explain the difficulties encountered when one tries to enhance this soil release agent deposition during the wash process. One theory suggests that the surfactants in the detergent may complex with or adsorb onto the soil release agent, thus inhibiting its deposition onto the fabric. Another theory has proposed that the main cleaning surfactants in the detergent compositions compete with the soil release agents for sites on the fabric. This competition prevents the soil release agents from getting to the fabric.

Anionic surfactants such as alkylbenzenesulfonates, alkylether sulfates, etc., are the major active cleaning agents in most laundry detergent systems. They are known to have antagonistic effects on the polymer deposition and interfere with the soil release polymer's properties. These antagonistic effects are further exacerbated because anionic surfactants are generally used at high concentrations for general soil and stain removal performance in most commercial detergent compositions.

U.S. Pat. No. 5,565,145 to Watson, et al. discloses detergent compositions comprising cleaning and soil dispersing agents that consist of ethoxylated/propoxylated polyalkyleneamine polymers. The detergents are allegedly useful in the cleaning of fabrics and hard surface areas.

U.S. Pat. No. 5,332,528 to Pan, et al. discloses detergent compositions containing one or more anionic primary surfactants and a soil release composition consisting of a soil release agent and an anionic surfactant interactive nonionic hydrophile and/or an anionic surfactant interactive hydrophobic moiety or both, together with a soil release agent enhancer consisting of a polyhydroxy fatty acid amide.

Prior to the present invention, the synergistic benefits of mixtures of certain classes of surfactants and soil release agents were limited to combinations of SRPS and polyhydroxy fatty acid amides. It would be a major achievement to provide other detergent additives that would enhance the deposition of soil release agents onto the textile material being washed by the consumer and thus provide long lasting soil release properties for the life of the material.

The present invention relates to compositions and methods of use of certain specific surfactants that are able to dramatically lower the critical micelle concentration (cmc) of anionic laundry deterrent and other cleaning systems which thereby allows for the better deposition of polymeric soil release agents onto the fabrics being washed. More particularly, the present invention relates to compositions and methods of use of low concentrations of amphoteric and long chain nonionic alkoxylate surfactants to enhance the deposition of polymeric soil release agents in the presence of typical detergent ingredients, especially highly anionic surfactant systems.

A further object of the present invention is to provide detergent compositions with enhanced soil release properties. More specifically, an object of the present invention is to provide textile detergent compositions comprising a soil release agent and at least one surfactant that dramatically lowers the critical micelle concentration (cmc) of the system. Another object of the present invention is to provide detergency and soil release benefits in compositions which also act as fabric softeners. These and other objects will become apparent from the description of the invention in the present specification.

SUMMARY OF THE INVENTION

The present invention relates to detergent compositions having enhanced soil release properties. These compositions comprise at least one first surfactant or additive that chemically and functionally is able to reduce the critical micelle concentration (cmc) of the detergent system to very low levels and a soil release agent. The compounds that have been discovered to dramatically lower the cmc values of a detergent system are a number of amphoteric/zwitterionic and long chain nonionic alkoxylate surfactants which can be utilized singly or mixed together in blends. The soil release agents are any of the conventional soil release agents known by those skilled in the art. However, non-ionic soil release agents are preferred.

It has also been unexpectedly found that the amphoteric and long chain nonionic alkoxylate surfactants can be further combined with certain conventional well known anionic, nonionic, cationic and amphoteric/zwitterionic surfactant detergent systems in order to provide synergistic effects regarding the deposition of the soil release agents and their maintenance on the washed substrate, e.g., textiles. Serendipitously, the present invention not only promotes the deposition of soil release agents, but also enhances soil removal, general detergency, and secondary properties such as the prevention of soil redeposition on the fabric for an all around cleaner wash.

DETAILED DESCRIPTION OF THE PREFERRED EMBODIMENTS

The detergent compositions of the present invention achieve their unexpectedly superior soil release properties by combining either an amphoteric/zwitterionic surfactant and/or a long chain nonionic alkoxylate surfactant or other additive with a polymeric soil release agent. The surfactants useful in the practice of the present invention and the respective the soil release agents are discussed in greater detail below.

The surfactants that are useful in the enhancement of soil release polymer performance are those that lower the critical micelle concentration (cmc) levels of a detergent system to less than $1.0 \times 10^{-5}$ either by forming mixed micelles and/or by interacting with the anionic surfactants present in the detergent system.

The long chain nonionic alkoxylate surfactants which have been found to greatly enhance deposition of the soil release polymers onto the fabric include both ethoxylates and ethoxylate/propoxylate compounds. Alkyl phenol ethoxylates (a), ethoxylate propoxylates (b), and di- or tri-styrylphenol alkoxylates are useful in the practice of the present invention and comprise compounds of the structure:

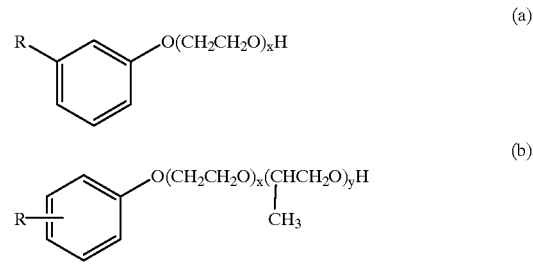

wherein R independently represents a straight or branched chain $C_{14}$ to $C_{30}$ alkyl, aryl, alkylene and alkyl aryl. Preferably it is a $C_{14}$ to $C_{22}$ linear alkyl, x is a whole integer of from about 1 to 100 and y is an integer from 0 to 50. Dialkyl phenol ethoxylates also exhibit superior cmc lowering capabilities and comprise compounds of the formula:

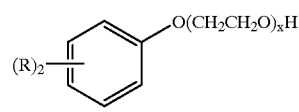

wherein R and x are hereinbefore defined and the two R groups may be the same or different.

Other suitable nonionic alcohol ethoxylates include compounds of the structure:

wherein R and x have been previously defined. Long chain alkylamine ethoxylates include compounds of the structure:

wherein R and x have been hereinbefore defined and y independently represents an integer comprising 1 or 2. Similar compounds are alkyl amido amine ethoxylates comprising compounds of the chemical structure:

$$RC(O)NH[(CH_2CH_2O)_xH]_y$$

wherein R, x and y have all been hereinbefore defined.

Other suitable nonionic surfactants that exhibit low cmc values in the soil release compositions of the present invention include the glycerol and polyglyceryl derivatives of long chain fatty acids. These comprise compounds of the structure:

$$ROC(O)-CH_2CH(OH)CH_2OH$$

wherein R has been previously defined. Sorbitan esters and their ethoxylates comprise compounds of the structure:

[structure of sorbitan ester ethoxylate with H(OCH$_2$CH$_2$)$_x$O—, O(CH$_2$CH$_2$O)$_x$H, CHCH$_2$COR, O(CH$_2$CH$_2$O)$_x$H]

wherein R and x have previously been defined. Long chain alkanol amides are also suitable for use as the surfactant of the soil release compositions and include compounds of the formula:

$$R-C(O)N(CH_2CH_2OH)_x$$

wherein R has been previously defined and x is 1 or 2. Other useful surfactants comprise the following:

a) Alkyl polyglycosides of the structural formula:

[structure: pyranose ring with HOH$_2$C, HO, OH, OH, O—R, subscript x]

wherein x is a number from about 1 to 4 and R has been previously defined.

The useful amphoteric surfactants that provide the cmc lowering functionality are selected from the group consisting of $C_{14}$ to $C_{22}$ amine oxides, $C_{16}$ to $C_{22}$ alkyl amido betaines, $C_{16}$–$C_{22}$ alkyl betaines, $C_{16}$ to $C_{22}$ alkylamphoacetates, $C_{16}$ to $C_{22}$ alkylamphopropionates, $C_{16}$ to $C_{22}$ N-methyl alkyltaurates and mixtures thereof. The hydrophobic chains of each species may also be fluorinated or silicone based. Specifically, the amphoteric surfactants that may be used include the following compounds with their respective structures:

a) Amine oxides b) Alkyl amphoacetates:

$$R-C(O)-NH-CH_2CH_2-N^+H CH_2CH_2OH$$
$$|$$
$$CH_2COO^-$$

wherein R is a $C_{12}$ to C22 straight or branched chain alkyl, aryl, alkylaryl and the like.

c) Alkyl amphopropionates:

$$R-C(O)-NH-CH_2CH_2-N^+-(CH_2CH_2COO^-)_2$$
$$|$$
$$CH_2CH_2OH$$

d) Alkyl amidoiminopropionates:

$$R-C(O)-NH-CH_2CH_2CH_2-N^+-CH_2CH_2COO^-$$
$$|$$
$$CH_2CH_2COOH$$

wherein R has been hereinbefore defined.

e) Alkyl iminopropionates:

$$R-N^+H-CH_2CH_2COO^-$$
$$|$$
$$CH_2CH_2COOH$$

wherein R has been hereinbefore defined.

f) Alkyl iminoacetates:

$$R-N^+H-CH_2COO^-$$
$$|$$
$$CH_2COOH$$

wherein R has been hereinbefore defined.

g) Alkyl betaines:

$$R-N^+(CH_3)_2-CH_2COO^-$$

wherein R has been hereinbefore defined.

h) Alkyl amidopropyl betaines:

$$R-C(O)-NH-CH_2CH_2CH_2-N^+(R_1)(R_2)-CH_2COO^-$$

wherein $R_1$ and $R_2$ independently represent methyl, ($CH_3$) ethyl (—$CH_2CH_3$) and R has been previously defined.

i) Alkyl amidopropyl sultaines:

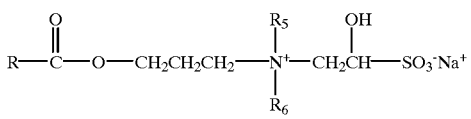

wherein R, $R_1$ and $R_2$ have been hereinbefore defined.
j) Dihydroxyethyl glycinates:

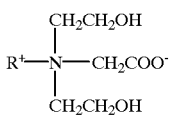

wherein R has been previously defined.
k) Alkyl etherhydroxypropyl sultaines:

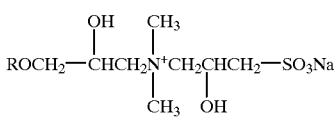

wherein R has been previously defined.

Soil release polymers that are useful in releasing hydrophobic stains from textile fibers, and especially synthetics, are also used as effective particle suspending agents for liquid detergent and fabric softener systems. Suitable soil release agents are disclosed in U.S. Pat. No. 5,332,528 to Pan, et al; U.S. Pat. Nos. 4,702,857, 4,956,447, 4,713,194, and 4,711,730, all to Gosselink, et al.; U.S. Pat. No. 4,877,896 to Maldonado, et al.; U.S. Pat. No. 4,873,003 to O'Lenick, et al.; U.S. Pat. No. 4,999,128 to Sonenstein, U.S. Pat. No. 4,749,596 to Evans, and U.S. Pat. No. 5,236,615 to Trinh, et al.; all of said patents being incorporated herein by reference. Typical soil release agents include nonionic or anionic polymers, and mixtures thereof.

Especially effective polymeric soil release agents are the block copolymers of polyalkylene terephthalate and polyoxyethylene terephthalate, and the block copolymers of polyalkylene terephthalate and polyethylene glycol. The polyalkylene terephthalate block copolymers preferably comprise ethylene and/or propylene alkylene groups. Many of such soil release polymers are nonionic. More specifically, these polymers are comprised of repeating units of ethylene and/or propylene terephthalate and polyethylene oxide terephthalate, preferably at a molar ratio of ethylene terephthalate units to polyethylene oxide terephthalate units of from about 25:75 to about 35:65, said polyethylene oxide terephthalate containing polyethylene oxide blocks having molecular weights of from about 300 to about 2000. The molecular weight of these polymeric soil release agents is in the range of from about 4,000 to about 55,000. Other useful soil release polymers include, but are not limited to, sulfonated polyethylene terephthalate, polyester urethane, and acetic acid ethenyl esters; the polyethylene terephthalate/polyoxyethylene terephthalate (PET-POET) polymer being most preferable. Typically, molecular weight ranges of these polymers are from 500 to 120,000, preferably 2000 to 35,000 and most preferably 2000 to 25,000.

U.S. Pat. No. 4,976,879 to Maldonado et al, discloses specific preferred soil release agents which can also provide an improved antistatic benefit. This patent is also incorporated herein by reference.

Another preferred polymeric soil release agent is a crystallizable polyester with repeat units of ethylene terephthalate containing from about 10% to about 15% by weight of ethylene terephthalate units together with from about 10% to about 50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the crystallizable polymeric compound is between 2:1 and 6:1. Examples of this polymer include the commercially available materials Zelcon 4780 (from DuPont) and Milease T (from ICI).

A more complete disclosure of these highly preferred soil release agents is contained in European Patent Application 185,427 to Gosselink, published Jun. 25, 1986, which is hereby incorporated herein by reference.

A preferred nonionic soil release polymer has the following average structure:

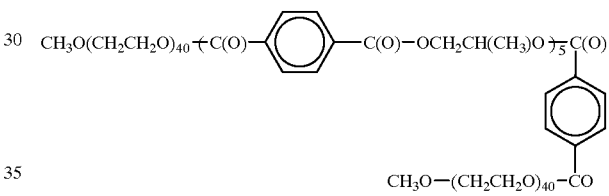

Such soil release polymers are described in U.S. Pat. No. 4,849,257 to Borcher, et al., this patent being incorporated herein by reference.

Another preferred nonionic soil release polymer has the following average structure:

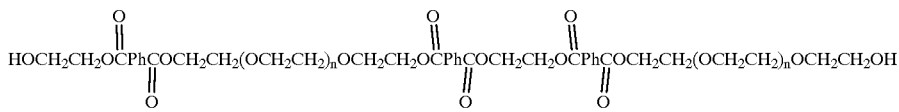

wherein Ph represents phenyl and n is preferably between about 50 to about 150.

Another preferred nonionic soil release polymer is described in U.S. patent application Ser. No. 07/676/682 filed Mar. 28, 1991 and now abandoned by Pan, et al., for Nonionic Soil Release Agents; this application being incorporated herein by reference.

The most preferred nonionic soil release agents are the REPEL-O-TEX line of soil release agents sold by Rhône-Poulenc Inc., Cranbury, N.J. These products include REPEL-O-TEX SRP3, REPEL-O-TEX SRP4, REPEL-O-TEX QCJ product and REPEL-O-TEX QCX products. VELVETOL 251C is a 100% active hydrophilic polyester from which REPEL-O-TEX SRP3, SRP4, AND QCJ are manufactured at different polymer concentrations. The polymers have a molecular weight of from about 3,000 to about 10,000. REPEL-O-TEX QCJ product is a 15 weight percent active dispersion of the above mentioned polymer for liquid laundry detergents, whereas SRP3 and SRP4 are diluted with sodium sulfate for powder detergent applications. The polymers of the REPEL-O-TEX products are nonionic polyester-polyether (PET-POET) transesterification co-polymers. The REPEL-O-TEX QCX is a higher molecular weight hydrophilic polyester polymer with a molecular weight range of from about 10,000 to about 35,000.

Suitable anionic polymeric or oligomeric soil release agents are disclosed in U.S. Pat. No. 4,018,569 to Trinh, U.S. Pat. No. 4,787,989 to Fanelli, et al.; and U.S. Pat. No. 4,808,086 to Evans et al., all of which are incorporated herein by reference.

Cationic polymeric soil release agents are also useful in the present invention. Suitable cationic soil release polymers are described in U.S. Pat. No. 4,956,447 to Gosselink, et al., U.S. Pat. No. 4,873,003 to O'Lenick, et al., and U.S. Pat. No. 5,405,542 to Trinh et al. These patents are also incorporated by reference herein.

Anionic surfactants that comprise the major active component in conventional detergent systems include any of the known hydrophobes attached to a carboxylate, sulfonate, sulfate or phosphate polar, solubilizing group including salts. Salts may be the sodium, potassium, ammonium and amine salts of such surfactants. Useful anionic surfactants can be organic sulfuric reaction products having in their molecular structure an alkyl group containing from about 8 to about 22 carbon atoms and a sulfonic acid or sulfuric acid ester group, or mixtures thereof. (Included in the term "alkyl" is the alkyl portion of acyl groups.) Examples of this group of synthetic detersive surfactants which can be used in the present invention are the alkyl sulfates, especially those obtained by sulfating the higher alcohols ($C_8$–$C_{18}$ carbon atoms) produced from the glycerides of tallow or coconut oil; and alkyl benzene sulfonates.

Other useful anionic surfactants herein include the esters of alpha-sulfonated fatty acids preferably containing from about 6 to 20 carbon atoms in the ester group; 2-acyloxyalkane-1-sulfonic acids preferably containing from about 2 to 9 carbon atoms in the acyl group and from about 9 to about 23 carbon atoms in the alkane moiety; alkyl ether sulfates preferably containing from about 10 to 20 carbon atoms in the alkyl group and from about 1 to 30 moles of ethylene oxide; olefin sulfonates preferably containing from about 12 to 24 carbon atoms; and beta-alkyloxy alkane sulfonates preferably containing from about 1 to 3 carbon atoms in the alkyl group and from about 8 to 20 carbon atoms in the alkane moiety.

Anionic surfactants based on the higher fatty acids, i.e., "soaps" are useful anionic surfactants herein. Higher fatty acids containing from about 8 to about 24 carbon atoms and preferably from about 10 to about 20 carbon atoms and the coconut and tallow soaps can also be used herein as corrosion inhibitors.

Preferred water-soluble anionic organic surfactants herein include linear alkyl benzene sulfonates containing from about 10 to about 18 carbon atoms in the alkyl group; branched alkyl benzene sulfonates containing from about 10 to about 18 carbon atoms in the alkyl group; the tallow range alkyl sulfates; the coconut range alkyl glyceryl sulfonates; alkyl ether (ethoxylated) sulfates wherein the alkyl moiety contains from about 12 to 18 carbon atoms and wherein the average degree of ethoxylation varies between 1 and 12, especially 3 to 9; the sulfated condensation products of tallow alcohol with from about 3 to 12, especially 6 to 9, moles of ethylene oxide; and olefin sulfonates containing from about 14 to 16 carbon atoms.

Specific preferred anionics for use herein include: the linear $C_{10}$–$C_{14}$ alkyl benzene sulfonates (LAS); the branched $C_{10}$–$C_{14}$ alkyl benzene sulfonates (ABS); the tallow alkyl sulfates, the coconut alkyl glyceryl ether sulfonates; the sulfated condensation products of mixed $C_{10}$–$C_{18}$ tallow alcohols with from about 1 to about 14 moles of ethylene oxide; and the mixtures of higher fatty acids containing from 10 to 18 carbon atoms.

It is to be recognized that any of the foregoing anionic surfactants can be used separately herein or as mixtures. Moreover, commercial grades of the surfactants can contain non-interfering components which are processing by-products. For example, commercial alkaryl sulfonates, preferably $C_{10}$–$C_{14}$, can comprise alkyl benzene sulfonates, alkyl toluene sulfonates, alkyl naphthalene sulfonates and alkyl poly-benzenoid sulfonates. Such materials and mixtures thereof are fully contemplated for use herein.

Other examples of the anionic surfactants used herein include fatty acid soaps, ether carboxylic acids and salts thereof, alkane sulfonate salts, α-olefin sulfonate salts, sulfonate salts of higher fatty acid esters, higher alcohol sulfate ester or ether ester salts, alkyl, preferably higher alcohol phosphate ester and ether ester salts, and condensates of higher fatty acids and amino acids.

Fatty acid soaps include those having the formula: R—C(O)OM, wherein R is $C_6$ to $C_{22}$ alkyl and M is preferably sodium.

Salts of ether carboxylic acids and salts thereof include those having the formula: R—(OR$^1$)$_n$—OCH$_2$C(O)OM, wherein R is $C_6$ to $C_{22}$ alkyl, R$^1$ is $C_2$ to $C_{10}$, preferably $C_2$ alkyl, and M is preferably sodium.

Alkane sulfonate salts and α-olefin sulfonate salts have the formula: R—SO$_3$M, wherein R is $C_6$ to $C_{22}$ alkyl or α-olefin, respectively, and M is preferably sodium.

Sulfonate salts of higher fatty acid esters include those having the formula:

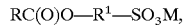

RC(O)O—R$^1$—SO$_3$M, wherein R is $C_{12}$ to $C_{22}$ alkyl, R$^1$ is $C_1$ to $C_{18}$ alkyl and M is preferably sodium.

Higher alcohol sulfate ester salts include those having the formula:

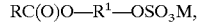

RC(O)O—R$^1$—OSO$_3$M, wherein R is $C_{12}$–$C_{22}$ alkyl, R$^1$ is $C_1$–$C_{18}$ hydroxyalkyl, M is preferably sodium.

Higher alcohol sulfate ether ester salts include those having the formula:

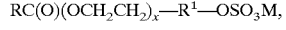

RC(O)(OCH$_2$CH$_2$)$_x$—R$^1$—OSO$_3$M, wherein R is $C_{12}$–$C_{22}$ alkyl, R$^1$ is $C_1$–$C_{18}$ hydroxyalkyl, M is preferably sodium and x is an integer from 5 to 25.

Higher alcohol phosphate ester and ether ester salts include compounds of the formulas:

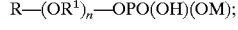

R—(OR$^1$)$_n$—OPO(OH)(OM);

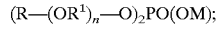

(R—(OR$^1$)$_n$—O)$_2$PO(OM);

and

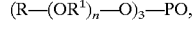

(R—(OR$^1$)$_n$—O)$_3$—PO, wherein R is alkyl or hydroxyalkyl of 12 to 22 carbon atoms, R$^1$ is $C_2H_4$, n is an integer from 5 to 25, and M is preferably sodium.

Other anionic surfactants herein are sodium coconut oil fatty acid monoglyceride sulfonates and sulfates; sodium or potassium salts of alkyl phenol ethylene oxide ether sulfates containing from about 1 to about 10 units of ethylene oxide per molecule and wherein the alkyl groups contain from about 8 to about 12 carbon atoms; and sodium or potassium salts of alkyl ethylene oxide ether sulfates containing about 1 to about 10 units of ethylene oxide per molecule and wherein the alkyl group contains from about 10 to about 20 carbon atoms.

Detergent compositions using the present invention may further include detergency builders selected from any of the conventional inorganic and organic water-soluble builder salts, including neutral or alkaline salts, as well as various water-insoluble and so-called "seeded" builders.

Builders are preferably selected from the various water-soluble, alkali metal, ammonium or substituted ammonium phosphates, polyphosphates, phosphonates, polyphosphonates, carbonates, silicates, borates, polyhydroxysulfonates, polyacetates, carboxylates, and polycarboxylates. Most preferred are the alkali metal, especially sodium, salts of the above.

Specific examples of inorganic phosphate builders are sodium and potassium tripolyphosphate, pyrophosphate, polymeric metaphosphate having a degree of polymerization of from about 6 to 21, and orthophosphate. Examples of polyphosphonate builders are the sodium and potassium salts of ethylene-1, 1-diphosphonic acid, the sodium and potassium salts of ethane 1-hydroxy-1, 1-diphosphonic acid and the sodium and potassium salts of ethane, 1,1,2-triphosphonic acid.

Examples of non-phosphorus, inorganic builders are sodium and potassium carbonate, bicarbonate, sesquicarbonate, tetraborate decahydrate, and silicate having a molar ratio of $SIO_2$ to alkali metal oxide of from about 0.5 to about 4.0, preferably from about 1.0 to about 2.4.

Water-soluble, non-phosphorus organic builders useful herein include the various alkali metal, ammonium and substituted ammonium polyacetates, carboxylates, polycarboxylates and polyhydroxysulfonates. Examples of polyacetate and polycarboxylate builders are the sodium, potassium, lithium, ammonium and substituted ammonium salts of ethylenediamine tetracetic acid, nitrilotriacetic acid, oxydisuccinic acid, mellitic acid, benzene polycarboxylic acids, and citric acid.

Highly preferred polycarboxylate builders herein are set forth in U.S. Pat. No. 3,308,067 to Diehl, which is again incorporated herein by reference. Such materials include the water-soluble salts of homo- and copolymers of aliphatic carboxylic acids such as maleic acid, itaconic acid, mesaconic acid, fumaric acid, aconitic acid, citraconic acid and methylenemalonic acid.

Other builders include the carboxylated carbohydrates of U.S. Pat. No. 3,723,322 to Diehl which is incorporated herein by reference.

Other useful builders herein are sodium and potassium carboxymethyloxymalonate, carboxymethyloxysuccinate, ciscyclohexanehexacarboxylate, cis-cyclopentanetetracarboxylate phloroglucinol trisulfonate, water-soluble polyacrylates (having molecular weights of from about 2,000 to about 200,000 for example), and the copolymers of maleic anhydride with vinyl methyl ether or ethylene.

Other suitable polycarboxylates for use herein are the polyacetal carboxylates described in U.S. Pat. Nos. 4,144,226, and 4,246,495, both to Crutchfield et al.; both of which are incorporated herein by reference.

"Insoluble" builders include both seeded builders such as 3:1 weight mixtures of sodium carbonate and calcium carbonate; and 2.7:1 weight mixtures of sodium sesquicarbonate and calcium carbonate. Amorphous and crystalline alumino silicates such as hydrated sodium Zeolite A are commonly used in laundry detergent applications. They have a particle size diameter of 0.1 micron to about 10 microns depending on water content of these molecules. These are referred to as ion exchange materials. Crystalline alumino silicates are characterized by their calcium ion exchange capacity. Amorphous alumino silicates are usually characterized by their magnesium exchange capacity. They can be naturally occurring or synthetically derived.

A detailed listing of suitable detergency builders can be found in U.S. Pat. No. 3,936,537 to Baskerville, et al. which is also incorporated herein by reference.

Detergent composition components may also include any one or more of a number of miscellaneous ingredients including hydrotropes, enzymes (e.g., proteases, amylases and cellulases), enzyme stabilizing agents, pH adjusting agents (monoethanolamine, sodium carbonate, etc.) halogen bleaches (e.g., sodium and potassium dichloroisocyanurates), peroxyacid bleaches (e.g., diperoxydodecane-1,1 2-dioic acid), inorganic per compound bleaches (e.g., sodium perborate), antioxidants as optional stabilizers, reductive agents, activators for per compound bleaches (e.g., tetra-acetylethylenediamine and sodium nonanoyloxybenzene sulfonate), soil suspending agents (e.g., sodium carboxymethyl cellulose), soil anti-redisposition agents, corrosion inhibitors, perfumes and dyes, buffers, whitening agents, solvents (e.g., glycols and aliphatic alcohols) and optical brighteners. Any of other commonly used auxiliary additives such as inorganic salts and common salt, humectants, solubilizing agents, UV absorbers, softeners, chelating agents, static control agents and viscosity modifiers may be added to the detergent compositions of the invention.

For bar compositions, processing aids are optionally used such as salts and/or low molecular weight alcohols such as monodihydric, dihydric (glycol, etc.), trihydric (glycerol, etc.), and polyhydric (polyols) alcohols. Bar compositions may also include insoluble particulate material components, referred to as "fillers" such as calcium carbonate, silica and the like.

The total weight percentages of the conventional surfactants of the present invention, all weight percentages being based on the total active weight of the compositions of this invention consisting of the nonionic ethoxylate and amphoteric surfactant(s), soil release agent(s), and (optionally) one or more other surfactants, detergency builder(s), additives and the like are about 10 to about 99.9 weight percent, preferably about 15–75 weight percent.

The long chain linear alkyl nonionic alcohol alkoxylates or amphoteric enhancers are combined with said soil release agent in a weight ratio of from about 1:10 to about 10:1 respectively and preferably in a weight ratio of about 1:2 to about 2:1. The nonionic alcohol alkoxylates and amphoteric enhancers are incorporated in the total detergent composition in an amount of from about 0.1 wt. % to 12 wt. % and preferably in an amount of from about 0.5 to 2.0 wt. %.

The polymeric soil release agents, are suitably employed at a level of from about 0.05 to about 40 active weight percent, preferably from about 0.2–15 wt. %, based on the total weight of the detergent formulation. The cmc lowering surfactants are incorporated into said soil release compositions with the soil release agent in a weight ratio of from about 1:10 to 10:1, respectively, and preferably in a weight ratio of about 1:2 to about 1:1. The soil release composition consisting of the soil release polymer and enhancer is incorporated in the total detergent formulation in an amount of from about 0.5 wt. % to about 15.0 wt. %.

The optional detergency builders are suitably present at a level of from about 0 to about 70 weight percent, preferably from about 5 to about 50 weight percent.

In the preparation of detergent and/or fabric softening compositions, other optional ingredients such as bleaches, enzymes, antioxidants, reductive agents, perfumes, fabric brighteners and the like may be included in amounts each of from about 0 to about 5 weight percent based on the active weight of the composition.

When the soil release compositions of the present invention are used in fabric softener compositions, they generally comprise from about 10 to 80 wt. % of a cationic conventional surfactant; and from about 0.005 to about 20, preferably 0.02–10 wt. % of the $C_{12}$ to $C_{22}$ amphoteric or long chain nonionic alkoxylate surfactant. They also contain about 0.1 to about 5, preferably about 0.2–3.0, most preferably about 0.2 to about 1.5 wt. % of polymeric soil release agent. Enhancer/polymer synergy enhances soil release and general detergency boosting benefits, and improves suspending/stabilizing properties of the polymeric suspending agents.

Other optional ingredients for liquid detergents include liquid carriers and adjuvants as disclosed by U.S. Pat. No. 5,402,542 to Trinh et al., which is incorporated herein by reference in its entirety.

The liquid carrier is preferably selected from the group consisting of water and mixtures of water and short chain $C_1$–$C_4$ monohydric alcohols. The water used can be distilled, deionized, or tap water. Mixtures of water and up to about 15% of a short chain alcohol such as ethanol, propanol, isopropanol or butanol, and mixtures thereof, are useful as the carrier liquid.

Adjuvants can be added to the softener compositions for their known purposes. Such adjuvants include, but are not limited to, clays, viscosity control agents, perfumes, emulsifiers, preservatives, anti-foaming agents, antioxidants, bactericides, fungicides, brighteners, opacifiers, freeze-thaw control agents, shrinkage control agents, and agents to provide ease of ironing. These adjuvants, if used, are added at their usual levels, generally each of up to about 5% by active weight of the composition.

The fabric softener compositions can be prepared by conventional methods such as those disclosed in Trink, et al. '542.

The following examples are presented in order to more specifically set forth in detail the compositions of the present invention and formulations for their use. They are for illustrative purposes only and it is understood that minor changes can be made with respect to the specific ingredients, their amounts and proportions that are not disclosed in or contemplated thereby. To the extent any such changes do not materially affect the make-up or properties of the final product, they are to be considered as falling within the spirit and scope of the invention as recited by the claims that follow:

EXAMPLE 1

In order to best illustrate the benefits of combining nonionic fatty acid ethoxylates together with soil release polymers and optionally, other conventional surfactants, the following examples were run. In the examples, a TERG-O-TOMETER, (United Testing Company, Hoboken, N.J.) which is a laboratory scale apparatus designed to simulate the washing process under controlled conditions, was used to evaluate soil release performance.

The soil release test procedure of these examples involved a prewash cycle (cloths or fabrics were repeatedly washed before staining). Clean fabrics, two DACRON single knit (DSK), two DACRON double knit (DDK) and two DACRON/cotton blends (D65/C35) from Scientific Services, or two pieces of cotton fabric, were prewashed for 12 minutes at 120° F., with 150 ppm (2/1 Ca++/Mg++) water hardness followed by a cold water rinse.

After drying for 45 minutes on a "high" dryer setting, swatches were stained with three drops of dirty motor oil. Swatches were allowed to wick overnight. The stained swatches were washed once under the same prewash conditions. The same formulas used in the prewash were used in the final wash. The detergents were evaluated as to cleaning efficacy and soil release polymer deposition by making the following measurements:

$Rd_1$=Average reflectance of prewashed fabric
$Rd_2$=Average reflectance of wicked cloth
$Rd_3$=Average reflectance of cleaned cloth The percent soil removed scores listed on the tables for each of the examples was calculated as follows:

$$\% \text{ soil removal}=((Rd_3 31\ Rd_2)/(Rd_1-Rd_2))\times 100\%.$$

It is noted that in all the examples, all like ingredient abbreviations or designations indicate like ingredients.

Compositions of the present invention were tested for effectiveness by measuring reflectance. A higher reflectance number means a cleaner fabric. According to the above test procedure, samples of the fabric were each washed five (5) times at 100° F. and 120° F. for 12 minutes. Detergent concentration was 1 gm. per liter (1 g/l) which is usually the recommended commercial use level. Dirty motor oil was then added to the fabric and the fabric was allowed to wick overnight. Afterwards, the oily fabric was washed once in a washing solution having the same composition used previously (in the prewash) and the fabric's reflectance was measured using Spectrogard equipment, common in the industry and available from BYK-Gardner.

In these Examples, the base detergent is an anionic detergent having an all anionic surfactant package except for Neodol 25-9 (1.3%). The composition is listed in TABLE 1. These examples and comparative examples all employ 1 active weight percent (wt %) REPEL-O-TEX QCX polymeric soil release polymer. This SRP is composed of 100% VELVETOL 251C (a polymer having a molecular weight range of 10,000–20,000). in co-pending application U.S. Ser. No. 08/726,437, now U.S. Pat. No. 5,922,663 it was disclosed that certain gemini surfactants also effectively lower the cmc values of detergent systems. Table 2 below shows soil release data for these gemini species. In comparison, the $C_{14}$–$C_{16}$ long chain nonionic alkoxylate and amphoteric surfactants show equivalent effectiveness as shown in Table 3.

TABLE 1

| Ingredient of Anionic Base Detergent A | Weight % |
|---|---|
| LAS[1] | 6.0% |
| PS-603[2] | 6.6 |
| NEODOL 25-9[3] | 1.3 |
| Na-Sulfate[4] | 8.3 |
| LSB[5] | 8.1 |
| Na-Carbonate[6] | 30.0 |
| Silicate[7] | 1.2 |
| Zeolite[8] | 29.3 |
| Perborate[9] | 0.6 |
| Water[10] | 2.3 |
| Additives[11] | QS |

Notes:
[1]Linear alkyl benzene sulfonate
[2]Linear ether sulfate-12–15C's chain, 3EO
[3]Linear alcohol ethoxylate, 12–15 C's
[4]Sodium sulfate
[5]Sodium lauryl sulfate
[6]Sodium carbonate
[7]Sodium silicate
[8]Builder Zeolite A
[9]Bleach
[10]Deionized
[11]Additives For comparative purposes, some of the formulations in the examples also employ, as the nonionic gemini surfactant, methylene bisoctyl-phenol ethoxylate (MBOP) having an average chain of 6.5 ethylene oxide groups for each of the two moieties of the gemini surfactant. Moreover, for any examples of the present disclosure, whenever the number of ethylene oxide units for MBOP is not indicated in the TABLES, the MBOP has 13 unit ethylene oxide chains. The amount of the gemini surfactant is listed in TABLE 2 as active weight percent. The following abbreviations represent their respective compounds:

QCX=Soil release polymer. High molecular weight polyester emulsion.

C1615=A nonionic, long chain alcohol ethoxylate with sixteen carbons and 15 ethylene oxide ($CH_2CH_2O$) (EO) units thereon.

Brij and C1620=Nonionic long chain linear alcohol ethoxylates with sixteen carbons, twenty (20) ethoxylates.

MBOP=Methylene bis-octylphenol ethoxylate gemini surfactant.

MBNP=Methylene bis-nonylphenol ethoxylate gemini surfactant.

Trimeric=A nonionic gemini surfactant.

Sultaine=A steroampho sultaine

Bet-0-30=Oleylamphopropyl betaine

The formula of the ethoxylated MBOP is as follows:

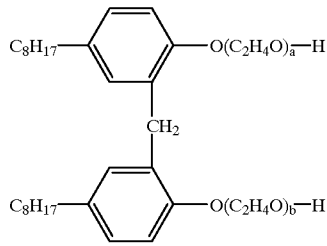

wherein a+b equals 13.

TABLE 2

SOIL REMOVAL OF DIRTY MOTOR OIL QCX/MBOP 13-DOE

| Detergent | DSK | DDK | C/P |
|---|---|---|---|
| 0.25QCX/0.1MBOP | 7.6 | 5.9 | 2.0 |
| 1.0QCX/0.1MBOP | 12.5 | 16.3 | 14.0 |
| 0.25CX/0.5MBOP | 20.0 | 28.5 | 17.4 |
| 1.0QCX/0.5MBOP | 94.0 | 7.56 | 54.1 |
| 0.25QCX/0.3MBOP | 32.5 | 27.5 | 22.7 |
| 0.63QCX/0.1MBOP | 6.1 | 5.7 | 3.5 |
| 0.63QCX/0.5MBOP | 91.3 | 69.5 | 50.0 |
| 0.63QCX/0.3MBOP | 80.2 | 55.4 | 38.9 |
| 0.63QCX/0.3MBOP | 80.3 | 57.4 | 37.5 |
| 0.63QCX/0.3MBOP | 80.1 | 51.1 | 38.1 |
| 1.0QCX/0L3MBOP | 82.3 | 59.2 | 47.8 |

EXAMPLE 2

The procedure of example 1 was repeated, this time using a sample of Base A with a C1615 nonionic ethoxylate soil release polymer enhancer. These were compared with compositions consisting of the soil release polymer and two gemini surfactants, methylene bis-octylphenol (MBOP) and methylene bis-octylphenyl, which are proven soil release polymer enhancers as set forth in the copending application referred to earlier. The fabrics were pre-washed five times (5×) as before at 120° F. The percentages of soil released are set forth in Table 4.

TABLE 3

| | PERCENT SOIL RELEASE | | |
|---|---|---|---|
| SAMPLE | DACRON/ DK | DACRON/ SK | Cotton/ Poly |
| Base A; 1% QCX + 0.4% C1615 | 41 | 89 | 38.5 |
| Base A; 1% QCX + 0.4% Trimeric | 46.5 | 88.5 | 31.5 |
| Base A; 1% QCX + 0.4% MBOP 18 | 33.5 | 86 | 44 |
| Base A; 1.0% QCX (control) | 17 | 20 | 35 |

Again, it is clearly shown that will all three fabric compositions the soil release polymer/nonionic fatty acid ethoxylate mixture gave superior soil release and cleaning efficacy.

EXAMPLE 3

Following the same procedures set forth in examples 1 and 2, the soil release efficacy of the composition of the present invention was examined using the same fabric materials (DACRON/double knit; DACRON single knit; and cotton/polyester blend), only this time the fabrics were pre-washed 8 times at a lower washing temperature (108° F.) with the Base A detergent composition set forth in Table 1 before the stain was applied. The percent soil release for each is given below in Table 4.

The soil release compositions comprising the linear nonionic alcohol ethoxylates were compared against similar compositions comprising a gemini surfactant since it is now known that gemini surfactants/soil release polymers also yield highly effective fabric protection and soil release. The percent soil release for ten different samples are as follows:

TABLE 4

| | | PERCENT SOIL RELEASE | | |
|---|---|---|---|---|
| | SAMPLE | DACRON/ DK | DACRON/ SK | Cotton/ Poly |
| A | Base A; 1% QCX + 0.4% C1615 | 26 | 92 | 59.5 |
| B | Base A; 1% QCX + 0.4% C1620 | 64/16 | 95 | 45 |
| C | Base A; 1% QCX 1471 + 1% C1620 | 76.5 | 93.5 | 57.5 |
| D | Base A; 1% QCX + 1% MBOP 18 | 71/44 | 40 | 61.5 |
| E | Base A; 1% QCX + 1% MBNP | 64.5 | 92.5 | 52 |
| F | Base A; 1% QCX + 1% Brij 58 | 81.5 | 93 | 50 |
| G | Base A; 1% QCX + 1% C1615 | 43.5 | 88 | 47 |
| H | Base A; 1% QCX + 1% C1620 | 50.5 | 92 | 54 |
| I | Base A; 1% QCX + 1% Trimeric | 39.5 | 91.5 | 48 |
| J | Base A; 1% QCX | 17 | 20 | 35 |

As is evident from the data, the C1620 nonionic alcohol ethoxylate/soil release polymer compositions of the present invention (A, B, C, F, G and H) gave excellent overall cleaning efficacy percentages as compared to the control cleaning compositions without an enhancer (composition J).

EXAMPLE 4

The procedure set forth in examples 1–3 was repeated using the same formulations but with a lower percentage of the cmc lowering surfactant incorporated therein in commercially available $C_{16}$–$C_{20}$ detergent products. As in Example 3, the fabrics were pre-washed eight times at 100° F.

TABLE 5

| SAMPLE | PERCENT SOIL RELEASE | | |
|---|---|---|---|
| | DACRON/ DK | DACRON/ SK | Cotton/ Poly |
| K  1% QCX + 0.4% C1620 | 81 | 90.5 | 41 |
| L  1% QCX + 0.4% MBNP | 69 | 88/24 | 46 |
| M  1% QCX + 0.4% Brij 58 | 59.5 | 81/3 | 45/19 |
| N  1% QCX + 0.4% Brij 56 | 74.5 | 92/13 | 38 |
| O  1% QCX + 0.4% Brij 58 | 70 | 93/42 | 48.5 |
| P  1% Blend of 1:1 QCX:C1620 | 86.5 | 91/60 | 60 |

Again, the long chain nonionic alcohol ethoxylate surfactants gave superior soil release percentages when compared with other soil release formulations comprising gemini surfactants. A 1:1 soil release polymer/alcohol ethoxylate blend gives the best results.

EXAMPLE 5

The procedure set forth in the previous examples was again repeated, this time using a steroampho-sultaine and an oleyl amphopropyl betaine as the critical micelle concentration lowering surfactants in the Base A (Table 1) detergent. Amphoteric in nature as distinguishable from the nonionic long chain ethoxylates, these also provided superior soil release enhancement. Both surfactants were tested with the QCX high molecular weight polyester emulsion polymer at levels of 1.0, 3.0 and 5.0 wt %. As before, the fabrics were pre-washed five (5×) times with the soil release polymer at 100° F. in amounts of 150 ppm water.

TABLE 6

| Sample | DACRON/ DK | DACRON/ SK | Cotton/ Poly |
|---|---|---|---|
| QCX | 17 | 20 | 35 |
| QCX + 1% stearoampho-sultaine | 23.5 | 77 | 34 |
| 3% | 21 | 92.5 | 35 |
| 5% | 13/32 | 93/53 | 46 |
| QCX + 1% Bet-0-30 | 59 | 94/78 | 42 |
| 3% | 52/15 | 90/69 | 53 |
| 5% | 86 | 95 | 54.5 |

As is evident from the data, the incorporation of the amphoteric surfactants at all levels gave superior soil release polymer functionality over the soil release polymer alone.

EXAMPLE 6

A second amphoteric surfactant with extremely low critical micelle lowering capabilities was tested with the QCX soil release properties to determine its soil release enhancement properties. The same test conditions were followed as before using a tallow amphopropionate sultaine surfactant in amounts of 0.3 wt. %, 0.5 wt. % and 0.8 wt. % in the Base A detergent composition. These were compared with a formulation using 1.0 wt. % QCX soil release polymer as before. The fabrics were again pre-washed five times (5×) and the wash test conducted in a wash cycle of 100° F. at a concentration of 150 ppm water. The results are set forth below.

TABLE 7

| Sample | DACRON/ DK | DACRON/ SK | Cotton/ Poly |
|---|---|---|---|
| QCX | 17 | 20 | 35 |
| 1471 + 0.8 tallow ampho | 35 | 78.5 | 52 |
| +0.5% | 48 | 89.5 | 64.5 |
| +0.3% | 32 | 67.5 | 49.5 |

Again, one sees superior results using the amphoteric cmc lowering surfactant at all levels then the soil release polymer alone, particularly with respect to the DACRON/single knit blends and the cotton/polyester blends.

EXAMPLE 7

Example 6 was repeated, this time using the tallow amphopropionate sultaine surfactant at levels of 1.0 wt. %, 3.0 wt. % and 5.0 wt. %. The results are summarized below:

TABLE 8

| Sample | DACRON/ DK | DACRON/ SK | Cotton/ Poly |
|---|---|---|---|
| QCX | 17 | 20 | 35 |
| QCX + 1% tallow ampho propionate sultaine surfactant | 18.5 | 89.5 | 45 |
| QCX + 3% | 17 | 85 | 54.5 |
| QCX + 5% | 16 | 91 | 47 |

As again is evident, the soil release functionality of the QCX polymer is enhanced, although not greatly over use of the surfactants at the lower levels.

EXAMPLE 8

The enhancement of soil release polymer functionality was examined using a detergent composition comprised of Base A and the QCX soil polymer enhanced with either a) disosium cocoamphopropionate (FBS) or b) sodium laroamphoacetate (HMA) at levels of 1.0 wt. %, 3.0 wt. % or 5.0 wt. % of each, respectively. The same procedure followed in the previous examples was followed as before.

TABLE 9

| Sample | DACRON/ DK | DACRON/ SK | Cotton/ Poly |
|---|---|---|---|
| Base A; QCX control | 17 | 20 | 35 |
| Base A; QCX + 1% HMA | 46 | 86 | 47 |
| Base A; 3% HMA | 57 | 89.5 | 46 |
| Base A; 5% HMA | 40.5 | 89.5 | 45.5 |
| Base A; +1% FBS | 42 | 87.5 | 45 |
| Base A; 3% FBS | 53 | 88.5 | 48 |
| Base A; 5% FBS | 53 | 89 | 56.5 |

As can be readily seen, the soil release polymer functionality was particularly enhanced using higher concentrations of the amphoteric surfactants and were particularly effective in the single knit DACRON fabrics, in some cases over four times more effective than the soil release polymer above.

What is claimed is:
1. An improved soil release composition comprising:
   (a) a polymeric soil release agent; and
   (b) a critical micelle concentration lowering nonionic surfactant selected from the group consisting of $C_{14}$–$C_{22}$ alkyl arylethoxylates, $C_{14}$–$C_{22}$ dialkylphenol ethoxylates, $C_6$–$C_{30}$ alkyl phenol propoxylates, $C_{14}$–$C_{22}$ long chain alkyl amine ethoxylates, $C_{14}$–$C_{22}$ alkyl amidoamine ethoxylates, $C_{14}$–$C_{22}$ alkylthiol ethoxylates, the glyceryl and polyglyceryl derivatives of $C_{14}$–$C_{22}$ fatty acid ethoxylates, $C_{14}$–$C_{22}$ sorbitan esters and their ethoxylates, long chain alkanol amides, $C_{14}$–$C_{22}$ alkyl polyglycosides and mixtures thereof.

2. The soil release composition of claim 1, wherein said surfactant lowers the critical micelle concentration of an aqueous detergent system to less than $1.0 \times 10^{-5}$.

3. The improved soil release composition of claim 2, wherein said polymeric soil release agent is selected from the group consisting of:
   i) block copolymers of polyalkylene terephthalate and polyoxyethylene terephthalate;
   ii) block copolymers of polyalkylene terephthalate and polyethylene glycol;
   iii) sulfonated polyethylene terephthalate;
   iv) polyester polyurethane; and
   v) acetic acid ethenyl esters.

4. The soil release composition of claim 3, wherein said soil release agent is a polyethylene terephthalate-polyoxyethylene terephthalate copolymer.

5. The soil release composition of claim 4, wherein said critical micelle concentration lowering surfactant comprises from about 0.25 to 75.0 wt. % of the soil release composition.

6. The composition of claim 5, wherein said polymeric soil release agent comprises from about 10.0 to 90.0 wt. % of the soil release composition.

7. A laundry detergent composition comprising the soil release composition of claim 3.

8. The detergent composition of claim 7, further comprising a conventional anionic surfactant selected from the group consisting of fatty acid soap, an ether carboxylic acid and salt thereof, an alkane sulfonate salt, an alpha-olefin sulfonate salt, a sulfonate salt of a higher fatty acid ester, a higher alcohol ester salt, fatty alcohol ether sulfate salts, an alkaryl sulfate, sulfonate or salt thereof, a higher alcohol phosphate ester salt, and a fatty alcohol ether phosphate ester salt, an alkyl glycerol sulfonate, sulfate or salt thereof, and a condensate of higher fatty acids.

9. The detergent composition of claim 7, further comprising one or more additional anionic, cationic, amphoteric or nonionic surfactants and mixtures thereof.

10. The detergent composition of claim 7, further comprising a cationic surfactant, wherein the cationic surfactant is the reaction product of higher fatty acids with a polyamine selected from the group consisting of hydroxyalkylalkylenediamine, dialkylenetriamine, and mixtures thereof.

11. The detergent composition of claim 10, wherein the cationic surfactant is selected from the group consisting of an alkyltrimethylammonium salt, a dialkyldimethylammonium salt, an alkyldimethylbenzylammonium salt, an alkylpyridinium salt, an alkylisoquinolinium salt, benzethonium chloride, an acylamino acid cationic surfactant and mixtures thereof.

12. The detergent composition of claim 11, further comprising hydrotropic agents, enzymes, detergency builders, bleach, dyes, whitening agents, auxiliary additives and mixtures thereof.

13. The soil release composition of claim 1, wherein said surfactant comprises $C_{14}$–$C_{22}$ alkyl arylethoxylate having a formula selected from the group consisting of:

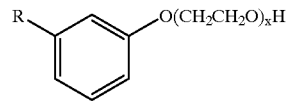

and

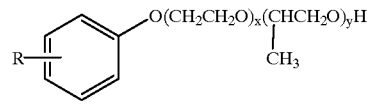

wherein R independently represents a straight or branched chain $C_{14}$–$C_{22}$ alkyl, aryl, alkylene and alkyl aryl, x is a whole integer of from about 1 to 100, and y is an integer from 0 to 50.

14. The soil release composition of claim 1, wherein said surfactant comprises dialkyl phenol ethoxylate having a formula:

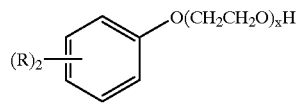

wherein R independently represents a straight or branched chain $C_4$–$C_{22}$ alkyl, aryl, alkylene and alkyl aryl, and x is a whole integer of from about 1 to 100.

15. The soil release composition of claim 1, wherein said surfactant comprises long chain alkylamine ethoxylate having a formula:

wherein R represents a straight or branched chain $C_{14}$–$C_{22}$ alkyl, aryl, alkylene and alkyl aryl, x is a whole integer of from about 1 to 100, and y is an integer from 1 to 2.

16. The soil release composition of claim 1, wherein said surfactant comprises alkyl amido amine ethoxylate having a formula:

wherein R represents a straight or branched chain $C_{14}$–$C_{22}$ alkyl, aryl, alkylene and alkyl aryl, x is a whole integer of from about 1 to 100, and y is an integer from 1 to 2.

17. The soil release composition of claim 1, wherein said surfactant comprises glycerol or polyglyceryl derivative of long chain fatty acids having a formula:

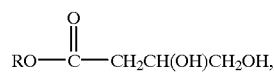

wherein R represents a straight or branched chain $C_{14}$–$C_{22}$ alkyl, aryl, alkylene and alkyl aryl.

18. The soil release composition of claim 1, wherein said surfactant comprises sorbitan ester or ethoxylate having a formula:

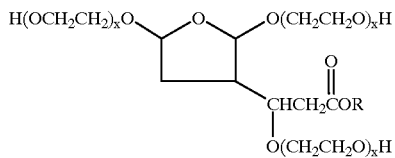

wherein R represents a straight or branched chain $C_{14}$–$C_{22}$ alkyl, aryl, alkylene and alkyl aryl, x is an integer from 1 to 100.

19. The soil release composition of claim 1, wherein said surfactant comprises long chain alkanol amide having a formula:

R—C(O)N(CH$_2$CH$_2$OH)$_x$, wherein R represents a straight or branched chain $C_{14}$–$C_{22}$ alkyl, aryl, alkylene and alkyl aryl, and x is an integer from 1 to 2.

20. The soil release composition of claim 1, wherein said surfactant comprises alkyl polyglycoside have a formula:

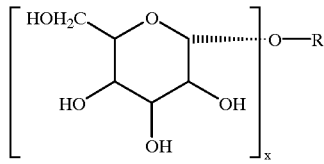

wherein R represents a straight or branched chain $C_{14}$–$C_{22}$ alkyl, aryl, alkylene and alkyl aryl, and x is an integer from 1 to 4.

* * * * *